United States Patent [19]

Lapeyre

[11] 4,324,976
[45] Apr. 13, 1982

[54] HAND-HELD CALCULATOR OR SIMILAR KEYBOARD DEVICE

[75] Inventor: James M. Lapeyre, New Orleans, La.

[73] Assignee: The Laitram Corporation, New Orleans, La.

[21] Appl. No.: 120,005

[22] Filed: Feb. 8, 1980

[51] Int. Cl.³ .............................................. G06C 7/02
[52] U.S. Cl. ........................... 235/145 R; 340/365 R
[58] Field of Search ................. 235/145 R, 10, 145 A, 235/146; 200/5 A, 6 A; 364/705, 708; 340/365 R, 365 VL

[56] References Cited

U.S. PATENT DOCUMENTS 4,128,889 12/1978 Ojima et al. ..................... 200/5 A Primary Examiner—L. T. Hix
Assistant Examiner—Benjamin R. Fuller
Attorney, Agent, or Firm—Weingarten, Schurgin & Gagnebin

[57] ABSTRACT

A hand-held calculator in which respective keyboards are arranged along the front face and rear face of the calculator housing and disposed along transverse axes such that each keyboard is in immediate position for use upon rotation of a user's wrist without any repositioning of the calculator in the hand. The use of both front and rear keyboards permits additional keyboard capability without increasing calculator size and without requiring multi-function keys.

6 Claims, 5 Drawing Figures

HAND-HELD CALCULATOR OR SIMILAR KEYBOARD DEVICE

FIELD OF THE INVENTION

This invention relates to hand-held calculators or similar keyboard devices and more particularly to a keyboard structure for such devices.

BACKGROUND OF THE INVENTION

As hand-held calculators have become more sophisticated and complex in respect of their available functions and computational abilities, the keyboard has become enlarged to the physical size limits of the device. Multi-function keys are now widely employed in the more sophisticated scientific and business calculators to permit some or all of the keys to serve different functions, depending upon the previous actuation of one or more of the selection or shift keys. One or more selection keys are activated to choose the intended function or value of the associated keys of the keyboard; thus, the keys represent one function or value when the selected key is in one position, and another function or value when the selector is in a second position. More than one selection key may be provided in a particular calculator operating format. The multi-function keys of present calculators are imprinted or labelled with the function or value on the top surface and one or more side surfaces of the keys, as in the HP-34C and HP-41C of Hewlett Packard Company. Such multi-function keys are often difficult to read because of the small size of the legends. In addition, the operator must actuate the selection keys and associated multi-function keys in correct sequence in order to accomplish the intended operation.

SUMMARY OF THE INVENTION

Briefly, the present invention provides a hand-held calculator or other similar keyboard device in which first and second keyboards are provided, each on a respective front and rear face of the calculator housing and arranged such that each keyboard is in position for immediate use simply by rotation of a user's wrist with the calculator appropriately held by the user. The novel calculator or like device includes a first keyboard on the front face of the housing much as in a present calculator. A second keyboard is provided on the back face of the housing and is disposed along an axis which is transverse to the first keyboard axis such that upon manual rotation of a user's wrist, the rear keyboard is in immediate position for use without repositioning of the device in the hand. By use of such additional keyboard capacity provided by the front and rear keyboards, the multi-function keys of a conventional calculator can be eliminated or the number of such keys can be minimized. Additionally, the invention provides additional keyboard capacity beyond that permitted by the physical constraints of present devices in which only a single keyboard on the front face is present. For example, in the newer types of calculators having alpha-numeric capability, such as the HP-41C, the invention can be employed to great benefit by provision of a separate alpha keyboard on one face.

DESCRIPTION OF THE DRAWINGS

The invention will be more fully understood from the following detailed description taken in conjunction with the accompanying drawings, in which.

DETAILED DESCRIPTION OF THE INVENTION

The invention will be described as embodied in a hand-held calculator employing a numerical keyboard on the front face and an alpha keyboard on the rear face. It will be appreciated that the invention is equally well suited to a variety of different types of hand-held calculators whether of the alpha-numeric or numeric type. For example, one keyboard may be for scientific computations, and the other keyboard for financial computations. In addition, the invention is also useful in other hand-held keyboard devices such as data entry or storage devices.

Figure 1:
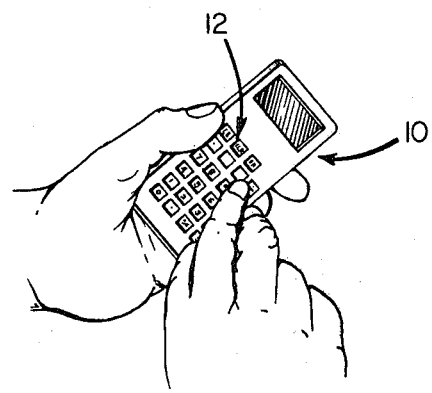
FIG. 1 is a pictorial view of a hand-held calculator as typically held for use of the front keyboard.
Figure 2:
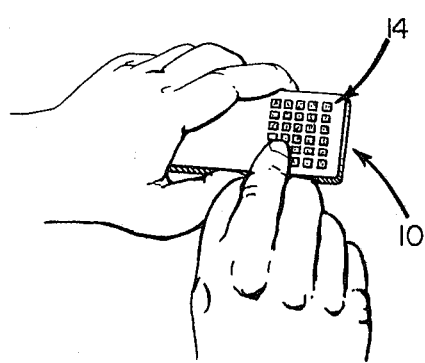
FIG. 2 is a pictorial view of the hand-held calculator as employed for use of the rear keyboard.

A hand-held calculator embodying the invention is illustrated in use in FIGS. 1 and 2. In FIG. 1 the calculator 10 is shown being held in the left hand of a user with the front keyboard 12 being manipulated by the forefinger of the user's right hand. In order to employ the rear keyboard 14 provided on the rear face of the calculator 10, as illustrated in FIG. 2, the user simply rotates his wrist by about 180 degrees to expose the rear calculator face and its keyboard for use. The rear keyboard 14 is disposed along an axis which is transverse to the axis of the front keyboard 12 such that each keyboard is in proper position for immediate use with the calculator appropriately held in the user's hand and rotated between the front position, as in FIG. 1, or the rear position, as in FIG. 2.

Figure 3:
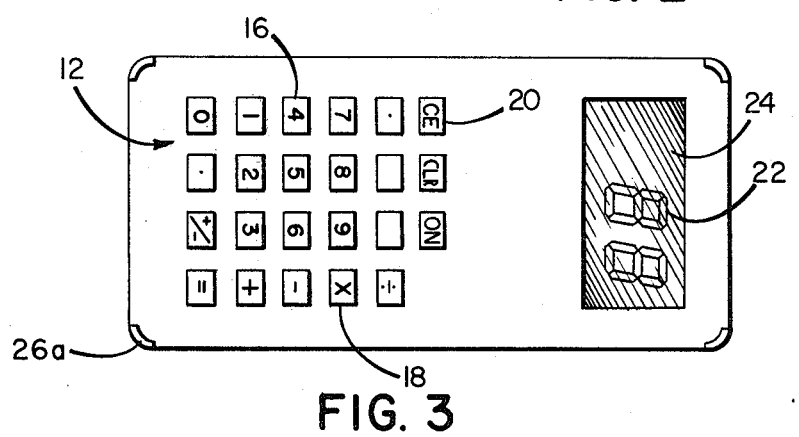
FIG. 3 is a plan view of the front face of a calculator embodying the invention.

The front face of the calculator is depicted in FIG. 3 and includes numerical keys 16, function keys 18, and control keys 20 arranged to be viewed in one direction and which comprise keyboard 12 disposed at the lower portion of the case. A display 22 is provided in window area 24, this display usually being a segmented display of the light emitting diode or liquid crystal type. Raised corner portions 26a are provided on the case of the calculator which extend outwardly beyond the top plane of the keyboard 12 to serve as guards to prevent accidental depression of the keys if the calculator is placed with its front face downward on a table or other work surface.

Figure 4:
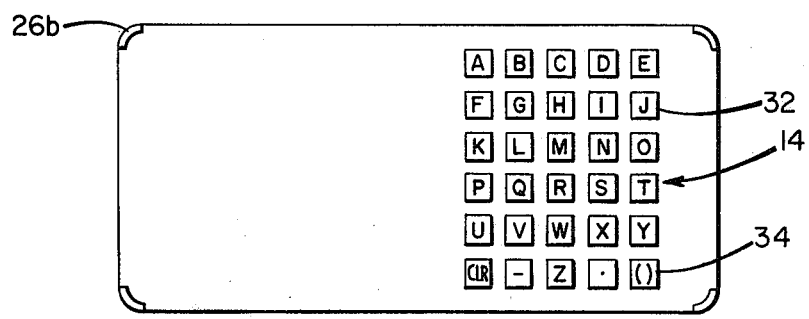
FIG. 4 is a plan view of the rear face of the calculator of FIG. 3.
Figure 5:
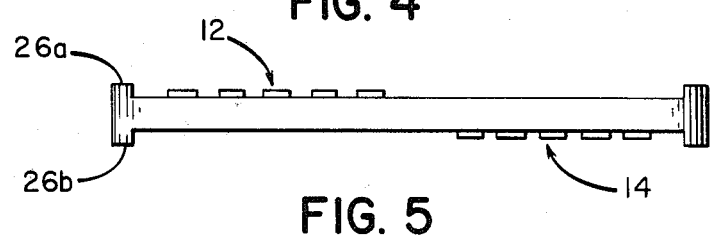
FIG. 5 is an elevation view of the calculator of FIGS. 3 and 4.

The rear face of the calculator is shown in FIG. 4 with the keyboard 14 disposed along the upper portion of the case and having indicia arranged to be viewed in a direction orthogonal to that associated with the front keyboard 12. The rear keyboard is, in the illustrated embodiment, an alpha keyboard containing letter keys 32 and punctuation keys 34. A shift key can be included to select upper and lower case letters. Corner portions 26b are provided as opposite extensions of the portions 26a on the front face, these portions outwardly extending beyond the plane of the rear keyboard 14 to also serve as guards against accidental depression of the rear keys if the calculator is disposed with the rear face downward on a table or other surface.

The relative disposition of the front and rear keyboards on the respective opposite faces of the calculator housing and the orthogonal disposition of the front and rear keyboards permits facile use of either keyboard by rotation of the user's wrist from a first to a second position as illustrated in FIGS. 1 and 2. A separate enter key can be provided for each keyboard if desired so that associated entries being made by actuation of selected keys of the front or rear keyboard can be entered into memory with the associated enter key on that face of the device then in use.

The electronic and mechanical implementation of the invention can be accomplished by use of well-known components and manufacturing techniques. The front and rear keyboards can be of any well-known form, such as those widely available in the various calculators on the market.

In use, an operator employs the front keyboard for performing intended numerical operations, and upon rotation of the wrist gains access to the rear keyboard for performing alpha entries and operations. There is no need to switch between a numerical mode and an alpha mode by use of a mode switch, as is required in known calculators, in which keys are employed for both numerical and alpha operation.

In a wholly numerical calculator, the invention can be employed to eliminate multi-function keys by provision of a separate keyboard. Alternatively, the multi-function keys and shift keys can be utilized in a dual keyboard in accordance with this invention to achieve greater computational capability.

The invention is not to be limited except as indicated in the appended claims.

I claim:

1. A hand-held keyboard device comprising a housing, a first keyboard on the front housing face, a second keyboard on the rear housing face, the housing being adapted to be held in a user's hand, such that in one hand position the first keyboard is in position for use, and upon rotation of the user's wrist, the second keyboard is in position for use without repositioning of the housing in the hand.

2. The device of claim 1 wherein said first keyboard is disposed at the lower portion of said housing and has keys with indicia oriented for viewing in one direction and said second keyboard is disposed at the upper portion of said housing and has keys with indicia oriented for viewing in a different direction.

3. The device of claim 1 wherein said first keyboard has keys with indicia oriented for viewing in one direction, and wherein said second keyboard has keys with indicia oriented for viewing in a direction orthogonal to said first direction.

4. The device of claim 1 wherein said first keyboard includes numerical and function keys and said second keyboard includes alpha keys.

5. The device of claim 1 wherein said housing includes means outwardly extending from at least one face beyond the outer plane of the associated keyboard to serve as a guard against accidental depression of keys of the associated keyboard with that face of the device placed downward on a surface.

6. The device of claim 5 wherein said outwardly extending means are on said rear housing face.

* * * * *